United States Patent [19]

Maghon

[11] Patent Number: 4,669,165
[45] Date of Patent: Jun. 2, 1987

[54] METHOD OF MANUFACTURING AND MOUNTING A SPLIT SPUR GEAR WITH EXTERNAL TEETH

[75] Inventor: Helmut Maghon, Mulheim, Fed. Rep. of Germany

[73] Assignee: Kraftwerk Union Aktiengesellschaft, Mulheim, Fed. Rep. of Germany

[21] Appl. No.: 814,652

[22] Filed: Dec. 30, 1985

Related U.S. Application Data

[63] Continuation-in-part of Ser. No. 533,891, Sep. 20, 1983, abandoned.

[30] Foreign Application Priority Data

Sep. 15, 1980 [DE] Fed. Rep. of Germany ....... 3034761

[51] Int. Cl.$^4$ .................... B23P 15/14; B21D 53/28
[52] U.S. Cl. .................... 29/159.2; 29/416; 29/447
[58] Field of Search .............. 29/DIG. 35, 159.2, 412, 29/416, 447; 74/439, 446, 448, 450

[56] References Cited

U.S. PATENT DOCUMENTS

| 101,352 | 3/1870 | Copeley | 411/506 |
| 595,553 | 12/1897 | Bissell | 29/159.2 |
| 965,443 | 7/1910 | Culp | 74/448 |
| 975,743 | 11/1910 | Bloomfield | 74/448 |
| 1,678,582 | 7/1928 | Allen | 74/410 |
| 3,439,551 | 4/1969 | Militana | 74/450 |
| 3,590,619 | 7/1971 | Sheldon | 29/159.2 |
| 3,852,872 | 12/1974 | Afanador et al. | 29/447 |
| 4,007,540 | 2/1977 | Tyree | 411/504 |
| 4,125,026 | 11/1978 | Torii et al. | 29/159.2 |

FOREIGN PATENT DOCUMENTS

| 145506 | 11/1903 | Fed. Rep. of Germany | 29/159.2 |
| 2238190 | 7/1972 | Fed. Rep. of Germany | 411/504 |
| 651198 | 3/1951 | United Kingdom | 411/503 |
| 1295291 | 11/1972 | United Kingdom | 411/504 |
| 1314299 | 4/1973 | United Kingdom | 411/504 |

Primary Examiner—E. Michael Combs
Attorney, Agent, or Firm—Herbert L. Lerner; Laurence A. Greenberg

[57] ABSTRACT

A method of manufacturing a split spur gear having adjacent external teeth with tooth roots therebetween and of mounting the spur gear onto a shaft having a first cylindrical portion including a seating surface for the spur gear with a given diameter and a second cylindrical portion adjacent the seating surface for operating the spur gear with a diameter smaller than the given diameter includes subdividing an entire gear body having a region intended for tooth roots into gear rings for forming at least one separating surface therein normal to the axis of the gear, subdividing each gear ring into at least two toothless ring segments by forming separating gaps therein offset relative to each other in the circumferential direction of the gear through the region intended for tooth roots, interconnecting the gear rings by locking connection elements in place parallel to the axis of the gear, shrinking the gear body onto an auxiliary mandrel, making external teeth on the gear body after the gear body has been shrunk onto the mandrel, dismantling the gear body from the auxiliary mandrel, assembling the gear body onto the second cylindrical portion of the shaft, uniformly heating the gear body to a given shrink-fitting temperature, and shrinking the gear body onto the seating surface formed on the shaft.

3 Claims, 7 Drawing Figures

METHOD OF MANUFACTURING AND MOUNTING A SPLIT SPUR GEAR WITH EXTERNAL TEETH

This is a continuation-in-part of application Ser. No. 533,891 filed Sept. 20, 1983, now abandoned.

The invention relates to a method of manufacturing and mounting a split spur gear with external teeth onto a shaft, the spur gear being divided into gear rings by at least one separating gap normal to the axis of the gear, each gear ring being subdivided into at least two ring segments by separating gaps in the vicinity of the tooth root, the separating gaps being offset relative to each other in the circumferential direction and the gear rings being connected to each other by connecting elements assembled parallel to the axis.

It is already known to divide the gear body of transmission spur gears with straight external gearing into two halves. The connection of the two gear halves is accomplished by bolts at the rim and the hub. This is known, for instance, from U.S. Pat. No. 595,553. The division of the spur gears helps with the exchange of damaged transmission gears or transmission gear parts, especially for automobiles, where it is desirable not to have to disassemble or dismount the corresponding shaft or the transmission mechanism for the purpose of assembling the new spur gear.

A similar problem occurs with turbo-machines where it is very expensive to disassemble the shaft for the purpose of exchanging a spur gear that has become useless, such as after a tooth breaks off. In this case the spur gears with external teeth are shrink-fitted onto the coupling flange of the generator or the intermediate shaft between the turbine and the generator and they are intended for driving an oil pump or other auxiliary turbo-machine apparatus. The assembly of a spur gear that is divided into two gear halves is not possible in this case since such a spur gear could not safely absorb the centrifugal forces that occur at up to 3300 r.p.m.

With such high revolutions and large diameters of the spur gears, it is also not possible to initially divide them into gear rings normal to the axis and to then further divide these gear rings tangentially into gear ring segments and to brace them safely in regard to flywheel forces by means of tension studs that penetrate the gear ring segments in axial direction when reassembled into a spur gear on a double-conical rim. This is because the mechanical clamping forces of the tension studs are not satisfactory and because they weaken the supporting cross section. So-called axial torsion protecting bolts in the separation surfaces between the gear ring segments on one hand and their seating surfaces on the shaft on the other hand, have the disadvantage of being subjected to the notch effect at high revolutions and centrifugal or flywheel forces. Such a connection, which is not suitable in the framework of the present invention which deals with a connection for gear ring segments, is shown in U.S. Pat. No. 975,743.

If gear ring parts shift during operation because of high centrifugal forces an forces affecting the teeth, errors in the distribution of the teeth can emerge, which have an even stronger effect with helical gearing.

It is accordingly an object of the invention to provide a method of manufacturing and mounting a split spur gear with external teeth, which overcomes the hereinafore-mentioned disadvantages of the heretofore-known methods of this general type, and to construct the spur gear in such a way that it can be assembled over the shaft from individual gear ring segments and that it can be connected to the shaft, without the possibility of errors in the pitch or distribution occurring during the assembly or during operation.

It is particularly the object of the invention to lay out the process in such a way that the spur gear can be assembled over the shaft from its individual spur gear segments and shrink-fitted on the same, without the possibility of the above-mentioned errors in pitch or distribution of the teeth occurring.

With the foregoing and other objects in view there is provided, in accordance with the invention, a method of manufacturing a split spur gear having adjacent external teeth with tooth roots therebetween and of mounting the spur gear onto a shaft having a first cylindrical portion including a seating surface for the spur gear with a given diameter and a second cylindrical portion adjacent the seating surface for operating the spur gear with a diameter smaller than the given diameter, which comprises subdividing an entire gear body having a region intended for tooth roots into gear rings by forming at least one separating surface therein normal to the axis of the gear, subdividing each gear ring into at least two toothless ring segments by forming separating gaps therein offset relative to each other in the circumferential direction of the gear through the region intended for tooth roots, interconnecting the gear rings by locking connection elements in place parallel to the axis of the gear, shrinking the gear body onto an auxiliary mandrel, making external teeth on the gear body after the gear body has been shrunk onto the mandrel, dismantling the gear body from the auxiliary mandrel, assembling the gear body onto the second cylindrical portion of the shaft, uniformaly heating the gear body to a given shrink-fitting temperature, and shrinking the gear body onto the seating surface formed on the shaft.

In accordance with another mode of the invention, there is provided a method which comprises finish cutting at least one end surface of the gear body shrunk onto the auxiliary mandrel before making the external teeth.

In accordance with a concomitant mode of the invention, there is provided method which comprises bevelling said external teeth.

The advantages that can be achieved with the invention can most of all be seen in the fact that the danger of pitch errors is fundamentally reduced with the use of form-locking connection elements for the connection of the ring elements and that with the pre-assembled spur gear shrink-fitted onto an auxiliary mandrel, conditions similar to those occurring during the assembly can be simulated, which means that pitch errors that are possible when shrink-fitting onto the shaft are already compensated during the manufacture of the external gearing. A form-locking connection occurs where parts are locked together by virtue of their own shape, as opposed to a force-locking connection requiring external force. The precision that can be achieved is so good that even the manufacture of helical gearing with bevelled external teeth can be accomplished without problems. By turning the front surface of the spur gear that is shrink-fitted on the auxiliary mandrel before the manufacture of the external gearing, a reference surface for the operational control of the spur gear during the assembly is achieved.

A spur gear manufactured according to the method of the invention is intended as a replacement for a one-piece spur gear which is shrink-fitted onto the coupling flange of a generator run by a gas turbine that drives the main oil pump. Through the use of a multi-partite replacement spur gear which can be assembled over the shaft, the disassembly or dismounting of the turbine which used to be necessary for the exchange of the spur gear, is avoided. This not only leads to a substantial savings in time but also to a savings in cost.

Other features which are considered as characteristic for the invention are set forth in the appended claims.

Although the invention is illustrated and described herein as embodied in a method of manufacturing and mounting a split spur gear with external teeth, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompaying drawings, in which:

FIG. 1 is a fragmentary, diagrammtic, cross-sectional view illustrating details of a prior art coupling of the compressor shaft of a gas turbine at the left side of the figure, to the shaft of an electrical generator driven by a gas turbine at the right side of the figure, including a rotor disc of an oil turbine of a shaft-turning device inserted in the center between the two coupling flanges and a one-piece spur gear shrink-fitted on the left end of the compressor coupling casing;

Figure 1:
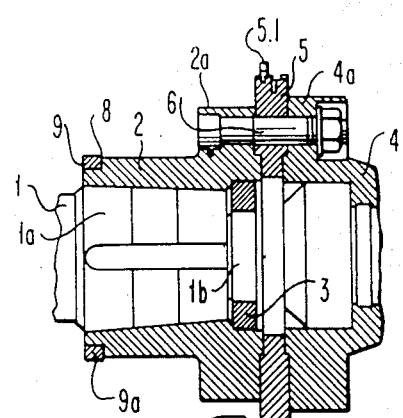

Referring now to the figures of the drawing and first particularly to FIG. 1 thereof, there is seen a conventional shaft-coupling and transmission apparatus for a gas turbo-set, in which a coupling casing 2 is connected securely against torsion to a conical shaft end 1a of a gas turbine compressor shaft 1 and is secured in the illustrated position by a shaft nut 3 that is screwed onto a thread 1b of the shaft 1. The coupling casing 2 has a coupling flange 2a thereon and the coaxially oppositely disposed generator shaft 4 has a corresponding coaxial coupling flange 4a thereon. The two coupling flanges 2a, 4a are connected to each other and secured against torsion by an inserted wheel disc 5 which carries a bucket ring 5.1, connected by means of coupling bolts 6 that are evenly distributed over the circumference of the coupling flanges 2a, 4a; only one of these bolts is shown in FIG. 1. The bucket ring 5.1 together with a diagrammatically-illustrated nozzle or jet device 7 forms an oil turbine which serves for slowly turning the shaft during the time when the turbo-set is not in loaded operation. An annular seat 8 is cut into the left front surface of the coupling casing 2 at a larger diameter than the rest of the gas turbine compressor shaft 1. A one-piece spur gear 9 is shrink-fitted onto the annular seat 8 by the manufacturer, in other words before the turbo-set shaft is assembled. The spur gear 9 is part of a transmission which drives the non-illustrated main oil pump. During the operation of the spur gear 9, one or more teeth of the gearing 9a at the outer periphery thereof, which is usually helical gearing, may be damaged. If this happens the spur gear 9 has to be replaced by a new one; for this purpose the spur gear 9 is cut apart and dismounted.

If the new or replacement spur gear was made in one piece, it could not be shrink-fitted on without dismounting of the turbo-set shaft 1, 4. In accordance with the invention the new spur gear 9 is divided into spur gear segments in a particular manner after having been previously worked on and dismounted. The new spur gear is then put in place and reassembled at the part of the shaft 1 which is more narrow than the seating surfaces 8 and is then shrink-fitted on the annular seat 8, as explained below.

Figure 2A:
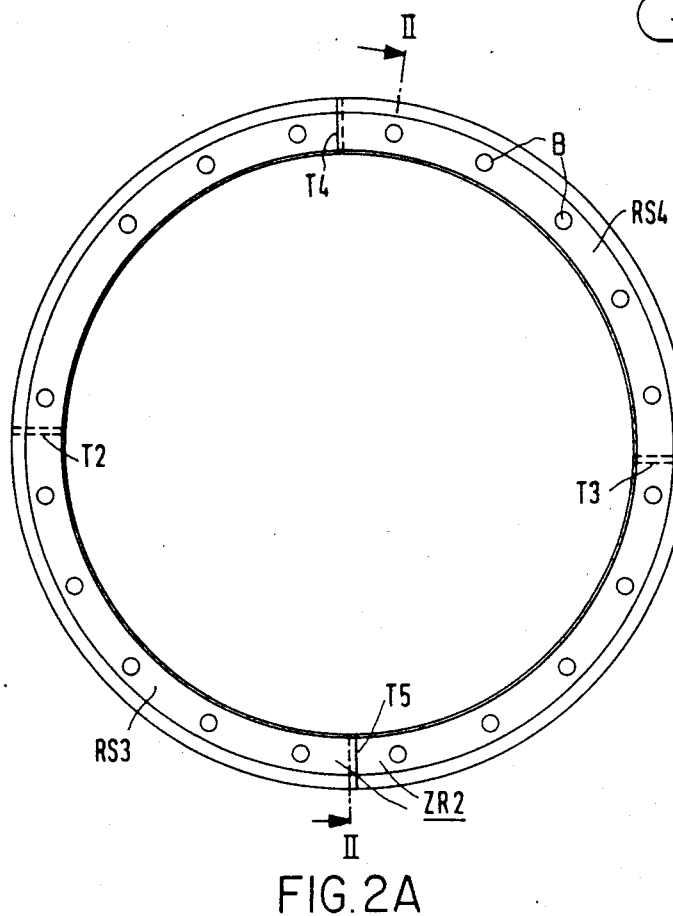
FIG. 2A is a diagrammatic top-plan view of a spur gear assembled from four ring elements, with helical external teeth.
Figure 2B:
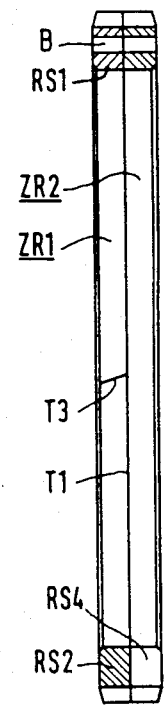
FIG. 2B is a cross-sectional view taken along the line II—II of FIG. 2A, in the direction of the arrows.
Figure 3:
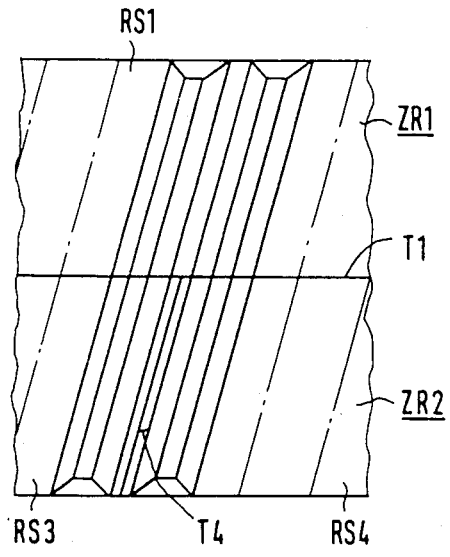
FIG. 3 is a fragmentary top-plan view onto the external teeth in the vicinity of a separating gap between two ring segments.

FIGS. 2A and 2B show a top view and a cross section of a spur gear with helical external teeth according to DIN 867 specifications, and the following dimensions and gear characteristics:

Number of teeth: 82
Normal plane pitch: 6
Pitch circle diameter: 510.46 mm
Angle on inclination: 15° 27′ 14.6″ rising to the right
Crown circle: 522.5 mm
Inside diameter: 440.1 mm
Width of gear: 50 mm A separating surface T1 normal to the axis, subdivides the spur gear into two gear rings ZR1 and ZR2, both gear rings ZR1 and ZR2 having the same axial width. The gear ring ZR1 in turn is subdivided by separating gaps T2 and T3 into ring segments RS1 and RS2. Similarly, the gear ring ZR2 is subdivided by separating gaps T4 and T5 into ring segments RS3 and RS4. The separating gaps T2, T3, T4 and T5 are each always arranged between two teeth in the vicinity of the root of the tooth, i.e., they have the same angle of inclination as the teeth. This shape of the separating gap T4 may be seen in the top view of FIG. 3. The separating gap T4 formed between the ring segments RS3 and RS4 runs exactly between two adjacent teeth in the center of the tooth bottom and ends at the separating surface TI normal to the axis. The ring segment RS1 of the gear ring ZR1 is not divided in the vicinity of the separating gap T4 and can therefore safely take up the forces acting in the circumferential direction in this region.

To obtain a distribution of the centrifugal forces active in operation over the circumference of the spur gear which is as uniform as possible, the separating gaps T2, T3, T4 and T5 are uniformly offset relative to each other in the circumferential direction as far as the given pitch allows. The separating gaps T2 and T4 as well as T3 and T5 are offset herein relative to each other by twenty teeth, while the separating gaps T2 and T5 as well as T3 and T4 are offset from each other by 21 teeth each. This means, therefore, that the ring segments RS1, RS2, RS3 and RS4 each have 41 teeth.

Figure 4:
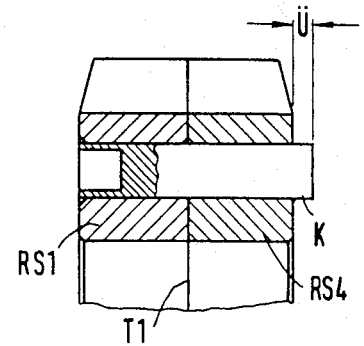
FIGS. 4 to 6 are similar fragmentary views which show the connection of the ring segments by conical pins after the latter are pressed in, in the condition as received for assembly and in the installed condition.
Figure 5:
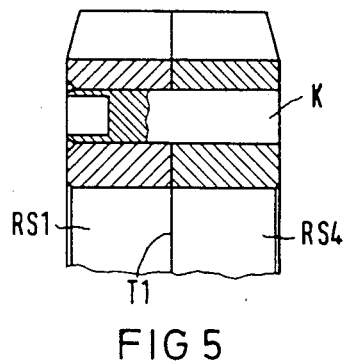
Figure 6:
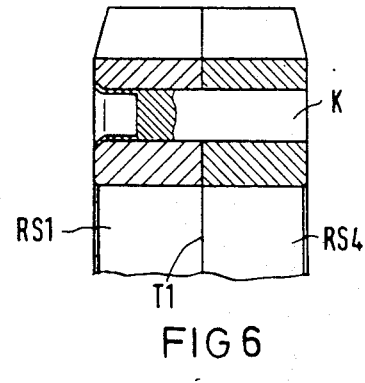

To join the individual ring segments RS1, RS2, RS3 and RS4 together, a total of twenty holes B, uniformly distributed over the circumference, are provided parallel to the axis in the region between the inside diameter of the spur gear and the root circle of the gear; these holes are drilled together and reamed with a conical reamer, and are provided for receiving conical pins K. These conical pins K are pressed without lubricant into the holes B with a defined pressing-in force of between 40,000 and 45,000 N leaving, according to FIG. 4, an excess ü of the large diameter of the conical pins K protruding beyond the end face of the spur gear. These excess amounts ü are then faced or turned off, so that according to FIG. 5, the large diameter end of the conical pins K terminates flush with the corresponding end face of the spur gear when the spur gear is received for installation. During the installation of the spur gear, the conical pins K are then pressed-in flush again by means of a fixture, so that the same conditions again prevail when the spur gear is reassembled, according to FIG. 6. FIG. 6 also shows how the conical pins K are secured. The pins are drilled hollow at their small diameter end, and are expanded or riveted as shown by means of a fixture.

During the manufacture of the spur gear described above, the ring segments RS1, RS2, RS3 and RS4 are first made without teeth and joined together by pressing-in the conical pins K. Then, the assembled gear body is shrunk onto a mandrel with an outside diameter of 440.35 mm, whereupon the helical external teeth are milled. In this manner, no pitch errors can occur when the spur gear is shrunk onto the shaft during the assembly, since the same conditions prevail when the teeth are made as in the installed condition. While the spur gear is still shrunk onto the mandrel, at least one end face is also turned or faced off, so that a reference surface is available for the running control in the assembly.

The following steps are necessary for mounting the spur gear:

(a) Check the shaft seating surface. Permissible deviation: 0.02 mm.
(b) Measure the diameter of the shaft seating surface at four points uniformly distributed over the circumference and determine the actual diameter as an average. Permissible deviation between largest and smallest dimension: 0.02 mm.
(c) If required, rework the inside diameter of the spur gear. Required shrinkage: 0.25 to 0.29 mm.
(d) Take spur gear apart with fixture. The use of impact tools is not permissible.
(e) Assemble the spur gear over the smaller portion of the shaft. Insert the conical pins without lubricant and press-in, flush if possible, by means of a fixture. Check with a hairline ruler. The use of impact tools is not permissible. Permissible projection: 0.03 mm.
(f) Secure conical pins at the small diameter with a tool.
(g) Heat spur gear uniformly to 150° C. and shrink-on the seating surface.
(h) Check for circular and axial run. Permissible deviation: 0.02 mm.

The spur gear described above is provided as a replacement for a one-piece spur gear which is shrunk on the coupling flange of a generator that is driven by a gas turbine, and drives a main oil pump. By using a multipart replacement spur gear which can be assembled over the shaft, it is not necessary to disassemble the rotor, as has been necessary heretofore for replacing a spur gear. Thus, considerable cost savings are achieved, besides an appreciable reduction of the out-of-commission or break down time.

I claim:

1. Method of manufacturing a split spur gear having adjacent external teeth with tooth roots therebetween and of mounting the spur gear onto a shaft having a first cylindrical portion including a seating surface for the spur gear with a given diameter and a second cylindrical portion adjacent the seating surface for operating the spur gear with a diameter smaller than the given diameter, which comprises subdividing an entire gear body having a region intending for tooth roots into gear rings for forming at least one separating surface therein normal to the axis of the gear, subdividing each gear ring into at least two toothless ring segments by forming separating gaps therein offset relative to each other in the circumferential direction of the gear through the region intended for tooth roots, interconnecting the gear rings by locking connection elements in place parallel to the axis of the gear, shrinking the gear body onto an auxiliary mandrel with a given shrink-fitting force and temperature, making external teeth on the gear body after the gear body has been shrunk onto the mandrel, dismantling the gear body from the auxiliary mandrel, assembling the gear body onto the second cylindrical portion of the shaft, uniformily heating the gear body to substantially the same given shrink-fitting temperature, and shrinking the gear body onto the seating surface formed on the shaft with substantially the same given shrink-fitting force.

2. Method according to claim 1, which comprises finish cutting at least one end face of the gear body shrunk onto the auxiliary mandrel before making the external teeth.

3. Method according to claim 1, which comprises bevelling the external teeth.

* * * * *